Patented July 20, 1943

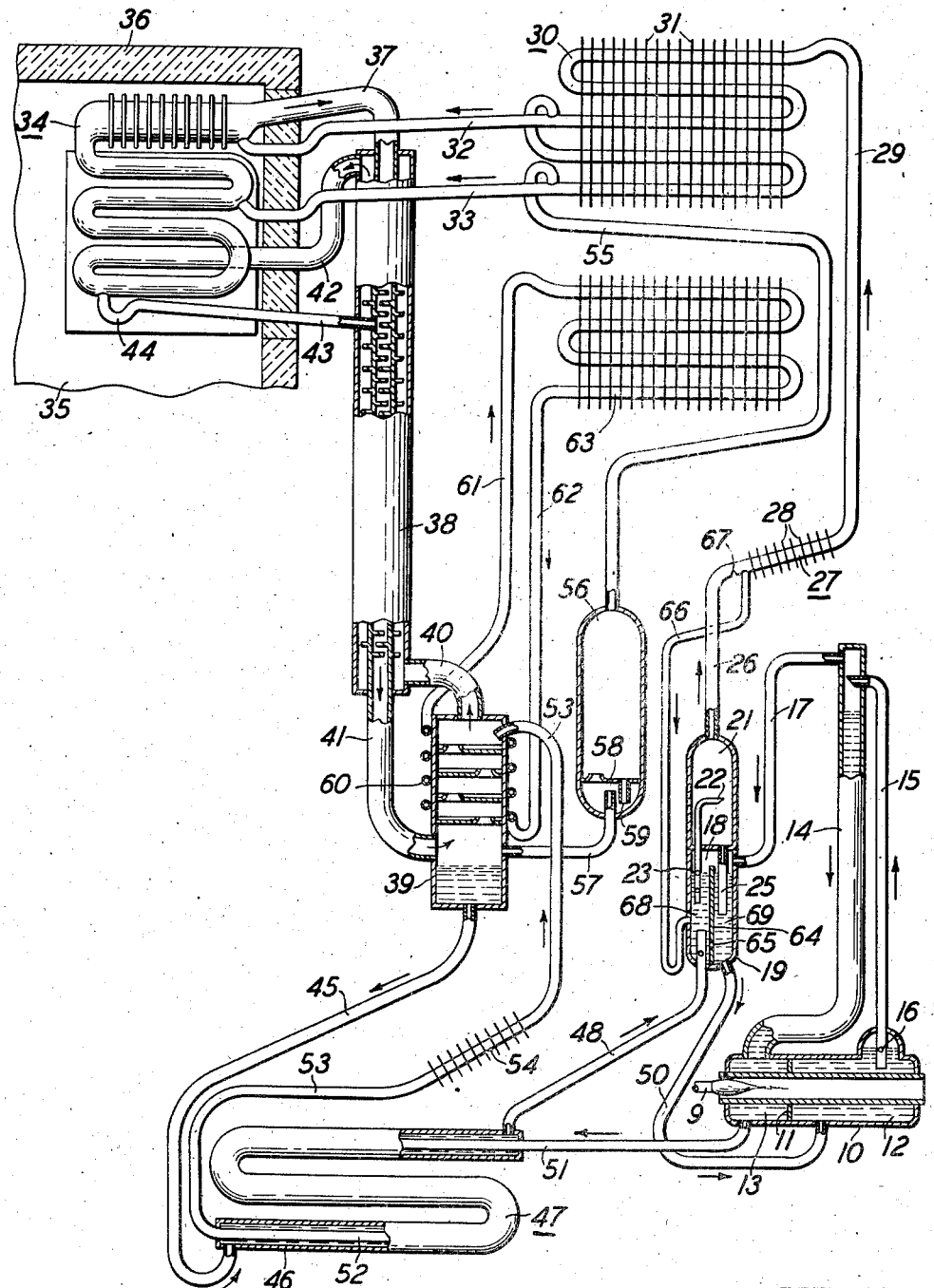

2,324,810

UNITED STATES PATENT OFFICE 2,324,810

REFRIGERATION

Carl T. Ashby, Evansville, Ind., assignor to Servel, Inc., New York, N. Y., a corporation of Delaware Application May 16, 1941, Serial No. 393,701

8 Claims. (Cl. 62—119.5)

My invention relates to absorption type refrigeration systems, and it is an object of the invention to provide an improvement in analyzation of vapor in such systems by segregation of liquid of different concentrations in the analyzer as set forth in the following description in connection with the accompanying drawing which shows more or less diagrammatically an absorption type refrigeration system embodying the invention.

Referring to the drawing, reference character 10 designates a generator divided by a partition 11 into a circulation chamber 12 and a weak liquid chamber 13. A standpipe 14 extends upward from chamber 13, and a vapor liquid lift conduit 15 extends from within pump chamber 12 to the upper part of standpipe 14. The lower end of conduit 15 projects below the level of liquid maintained within chamber 12 and is provided with an aperture 16 near its lower end. A conduit 17 connects the upper end of standpipe 14 to the upper part of chamber 18 formed in the lower part of an analyzer 19. A partition 64 divides chamber 18 into two pockets 68 and 69. The partition 64 has a small aperture 65 therein for liquid level equalization. A vapor liquid lift conduit 22 connects analyzer chamber 21 and pocket 68. A drain pipe 25 connects chamber 21 and pocket 69.

A conduit 26 communicates with the upper part of chamber 21 and leads upward to a rectifier 27 which may comprise a section of conduit provided with air cooling fins 28. The conduit 26 has a baffle or dam 67 therein located between the analyzer and the rectifier 27. A conduit 66 is connected from a point in the conduit 26 above the baffle 67, to pocket 68 of chamber 18. A conduit 29 connects rectifier 27 to the upper part of a condenser 30.

Conduits 32 and 33 connect condenser 30 with an evaporator 34 located within the space to be cooled 35 of a refrigerator cabinet 36. Conduit 32 connects an intermediate point of condenser 30 with the upper part of the evaporator while conduit 33 connects the bottom of the condenser with an intermediate point of the evaporator. Both conduits 32 and 33 are provided with liquid traps or seals.

A conduit 37 connects the upper part of evaporator 34 to the inner conduit of a gas heat exchanger 38, which in turn is connected by a conduit 41 to the lower part of an absorber 39. A conduit 40 connects the upper part of absorber 39 with the outer conduit of the heat exchanger 38, which in turn is connected by a conduit 42 with the lower part of evaporator 34. A drain conduit 43 connects the lowest point of the evaporator with conduit 37 and is provided with a liquid trap 44.

A conduit 45 connects the bottom of absorber 39 with the outer conduit 46 of a liquid heat exchanger 47, while a conduit 48 connects the other end of conduit 46 with the analyzer pocket 68. A conduit 50 connects the lower part of pocket 69 with chamber 12 of generator 10. Conduit 51 connects chamber 13 of the generator with the inner pipe 52 of the liquid heat exchanger 47 and a conduit 53 connects the other end of conduit 52 with the upper part of absorber 39. A portion of conduit 53 may be provided with air cooling fins 54.

A conduit 55 connects the lower end of condenser 30 with a storage vessel 56 and the lower part of vessel 56 is connected to the absorber 39 by means of a conduit 57. An apertured disc 58 is located near the bottom of vessel 56 and is provided with a drain conduit 59 which terminates near the bottom of vessel 56.

Absorber 39 may be provided directly with air cooling fins or a cooling coil 60 may be located in heat exchange relation with the outside of the absorber and connected by means of conduits 61 and 62 with the upper and lower ends, respectively, of a condenser 63.

The operation of the apparatus is as follows:

The above described system of conduits and vessels is charged with a suitable amount of absorption fluid, refrigerant, and a pressure equalizing gas which is inert with respect to both the absorption fluid and the refrigerant. Water as the absorption medium, ammonia as the refrigerant, and hydrogen as the inert gas may be used.

Application of heat to generator 10 by means of any suitable heating element, such as the burner 9, causes ammonia to be expelled from solution in the form of a vapor. Vapor collects in the upper part of chamber 12 and passes through aperture 16 in conduit 15 and entrains slugs of liquid within the conduit and lifts them to the upper part of standpipe 14 in well known manner. Ammonia vapor driven from the solution contained in chamber 13 passes upward through the standpipe 14. The mixture of ammonia and water vapors from both chambers 12 and 13 passes from the upper part of standpipe 14 through conduit 17 to the lower chamber 18 of analyzer 19. Pocket 68 of chamber 18 is supplied with enriched absorption liquid, that is absorption liquid in which refrigerant gas has been absorbed, and the vapor in chamber 18 passes through aperture 23 in conduit 22 and lifts a portion of this liquid through conduit 22 to upper chamber 21, in a manner similar to that described in connection with vapor liquid lift conduit 15.

The partition 64 prevents the incoming rich liquid from the liquid heat exchanger which is flowing into pocket 68 of chamber 18 from mixing with the weaker solution draining down conduit 25 into pocket 69. The port or hole 65 in partition 64 permits the liquid levels in pockets 68 and 69 to equalize, but is small enough to prevent any substantial mixing of the diluted liquid in pocket 69 and the richer liquid in pocket 68.

The baffle 67 provides a dam which prevents the rectifier condensate from draining down conduit 26 into pocket 69 via chamber 21 and tube 25. The rectifier condensate is directed down conduit 66 to pocket 68 containing the stronger liquid. The hot gaseous mixture of ammonia and water is brought into intimate contact with the cooler strong absorption liquid during the passage through conduit 22 so that water vapor which accompanies the refrigerant gas from the generator is condensed and returns with the solution through conduit 25 to pocket 69 of the lower chamber 18.

The refrigerant vapor passes upwardly through conduit 26 to rectifier 27. In the rectifier the vapor is cooled sufficiently to condense most of the remaining water vapor, which forms very rich solution and drains back through conduit 66 to the pocket 68 of the analyzer. Ammonia vapor passes through conduit 29 to the upper part of condenser 30. Here the ammonia is cooled and condenses during its passage through the condenser. That portion of the ammonia which has been condensed by the time it reaches conduit 32 flows therethrough to the upper part of evaporator 34. The remainder of the ammonia gas is condensed in the lower part of the condenser and flows through conduit 33 to an intermediate point in evaporator 34.

Hydrogen gas is admitted into the lower part of the evaporator through conduit 42 and comes in intimate contact with the liquid ammonia introduced into the evaporator. The ammonia evaporates and diffuses into the hydrogen, which evaporation results in absorption of heat from the chamber 35.

The mixture of ammonia and hydrogen passes from the top of evaporator 34 through conduit 37, heat exchanger 38, and conduit 41 to the lower part of absorber 39. Weak absorption liquid is introduced into the upper part of the absorber through conduit 53 and passes downwardly over apertured trays provided in the absorber, thus coming into intimate contact with the gaseous mixture of ammonia and hydrogen which passes upwardly through the absorber. The ammonia gas is absorbed by the water, while the hydrogen gas passes through the absorber and returns to the evaporator through conduits 40, 41 and 42.

The gas circulation between and through the evaporator and the absorber takes place by virtue of the fact that the mixture of hydrogen and ammonia from the evaporator is heavier than the relatively pure hydrogen from the absorber.

The strong absorption liquid formed in absorber 39 passes therefrom through conduit 45 and through conduit 46 of the heat exchanger and through conduit 48 to pocket 68 in the lower chamber 18 of the analyzer. As previously described the strong liquid here comes in contact with the vapor discharged from the generator and serves to remove a substantial portion of the water vapor from the ammonia vapor. From pocket 69 in chamber 18 the absorption liquid passes through conduit 50 to the circulation chamber 12 of the generator and, as previously described, is lifted through vapor liquid lift conduit 15 to the upper part of standpipe 14. Vapor liquid lift conduit 15 maintains a sufficient head of liquid in the standpipe to cause flow from chamber 13 through conduits 51, 52 and 53 to the upper part of absorber 39.

Vessel 56 provides a storage space for hydrogen. In the event that the atmospheric temperature rises, a higher pressure within the system will be necessary for condensation of ammonia to take place within the condenser. This higher pressure is obtained by virtue of the fact that, when the temperature increases, a portion of the ammonia will pass through the condenser without being liquefied and will pass through conduit 55 to storage vessel 56 and displace therefrom the stored hydrogen, which passes through conduit 57 into the main part of the system. This increases the pressure to a point sufficiently high so that ammonia will be condensed within the condenser.

The absorption of ammonia gas by water within absorber 39 results in the generation of heat, which is removed by vaporizing a suitable liquid contained in the cooling coil 60. The vapor thus formed passes through conduit 61 to condenser 63, which is cooled by the atmosphere to condense the vapor, which returns through conduit 62 to the lower end of cooling coil 60.

While I have described one more or less specific embodiment of my invention, it is to be understood that variations thereof fall within its scope as set forth in the following claims.

What is claimed is:

1. An absorption refrigeration system including a generator, an absorber, conduits for conducting enriched absorption liquid from said absorber to said generator, said conduits including an analyzer through which flows said enriched absorption liquid, conduits for conducting vapor from said generator to and from said analyzer, said analyzer being constructed and arranged so that the vapor passing therethrough bubbles through liquid therein, and a vertical wall in said analyzer to divide therein liquid through which vapor has bubbled from liquid entering the analyzer, said wall having a small passage therethrough so that liquid on opposite sides thereof has substantially the same surface level.

2. An absorption refrigeration system including an analyzer, said analyzer having a vapor inlet, a vapor outlet, a liquid inlet, a liquid outlet, a partition between said liquid inlet and liquid outlet dividing the liquid in said analyzer into two bodies having substantially the same surface levels, and means operated by flow of vapor through said analyzer for transferring liquid from one of said bodies to the other over said partition.

3. An absorption refrigeration system as in claim 2 in which said partition has a small opening below the surface levels of liquid in said bodies to maintain equalization of said surface levels.

4. An absorption refrigeration system including an analyzer having an upper chamber, a lower chamber, a partition dividing said lower chamber into two pockets communicating above said partition, an inlet for liquid to a first of said pockets, an outlet for liquid from the second of said pockets, an inlet for vapor to said lower chamber, an outlet for vapor from said upper chamber, a vapor lift conduit from said first pocket to said upper chamber, and a liquid drain conduit from said upper chamber to said second pocket.

5. An absorption refrigeration system as in claim 4 in which said partition has a small opening to permit equalization of surface levels of liquid on opposite sides thereof.

6. An absorption refrigeration system as in claim 4 which also includes a rectifier connected to receive vapor from said analyzer, and means for conducting condensate from said rectifier to said first pocket.

7. An absorption refrigeration system including a generator, an analyzer including a vapor liquid lift through which liquid flowing to said generator is raised by vapor flowing from said generator, a rectifier connected to receive vapor from said analyzer, and means for conducting condensate from said rectifier to join only that portion of the liquid flowing to said generator which has not yet passed through said lift.

8. An absorption refrigeration system including a generator, an absorber, conduits for conducting enriched absorption liquid from said absorber to said generator, said conduits including an analyzer through which flows said enriched absorption liquid, conduits for conducting vapor from said generator to and from said analyzer, said analyzer being constructed and arranged so that the vapor passing therethrough bubbles through liquid therein, a separator in said analyzer to divide therein liquid through which vapor has bubbled from liquid entering the analyzer, a rectifier connected to receive vapor from said analyzer, and means for conducting condensate from said rectifier to said analyzer and associated with the analyzer so that the condensate joins absorption liquid entering the analyzer and together therewith is kept separated by said separator from liquid through which vapor has bubbled.

CARL T. ASHBY.